(12) United States Patent
Tanigawa et al.

(10) Patent No.: US 11,108,461 B2
(45) Date of Patent: Aug. 31, 2021

(54) TESTING METHOD, LIGHT RECEIVING DEVICE, AND TESTING SYSTEM

(71) Applicants: YOKOGAWA ELECTRIC CORPORATION, Tokyo (JP); Yokogawa Test & Measurement Corporation, Tokyo (JP)

(72) Inventors: Akira Tanigawa, Tokyo (JP); Toshikazu Yamamoto, Tokyo (JP)

(73) Assignees: YOKOGAWA ELECTRIC CORPORATION, Tokyo (JP); Yokogawa Test & Measurement Corporation, Tokyo (JP)

(*) Notice: Subject to any disclaimer, the term of this patent is extended or adjusted under 35 U.S.C. 154(b) by 0 days.

(21) Appl. No.: 16/890,679

(22) Filed: Jun. 2, 2020

(65) Prior Publication Data

US 2021/0028858 A1 Jan. 28, 2021

(30) Foreign Application Priority Data

Jul. 22, 2019 (JP) .............................. JP2019-134492

(51) Int. Cl.
*H04B 10/073* (2013.01)
*G01M 11/00* (2006.01)
*G02B 6/44* (2006.01)

(52) U.S. Cl.
CPC ......... *H04B 10/0731* (2013.01); *G01M 11/33* (2013.01); *G02B 6/4403* (2013.01)

(58) Field of Classification Search
CPC ... H04B 10/0731; G01M 11/33; G02B 6/4403
USPC ....................................................... 356/73.1
See application file for complete search history.

(56) References Cited

U.S. PATENT DOCUMENTS

| 5,579,422 A | * | 11/1996 | Head | G02B 6/4206 |
| | | | | 372/108 |
| 2010/0097682 A1 | * | 4/2010 | Angeley | G02B 6/0006 |
| | | | | 359/227 |
| 2011/0013905 A1 | * | 1/2011 | Wang | G01M 11/33 |
| | | | | 398/21 |
| 2014/0125971 A1 | * | 5/2014 | Jiang | G01M 11/33 |
| | | | | 356/73.1 |
| 2019/0372665 A1 | * | 12/2019 | Masuda | G01M 11/39 |

FOREIGN PATENT DOCUMENTS

JP          H08-15086 A      1/1996

\* cited by examiner

*Primary Examiner* — Tarifur R Chowdhury
*Assistant Examiner* — Omar H Nixon
(74) *Attorney, Agent, or Firm* — Osha Bergman Watanabe & Burton LLP

(57) ABSTRACT

A method of testing a ribbon fiber cable is provided. The ribbon fiber cable includes optical fibers between a first end face and a second end face. End faces of the optical fibers are lined up in a single line in a line direction. The method includes: injecting light into each optical fiber at the second end face; measuring first power of the light exiting from each optical fiber at the first end face; disposing a member between the first end face and an optical sensor; injecting light into each optical fiber at the second end face; measuring second power of the light exiting from each optical fiber at the first end face; calculating a ratio of the second power to the first power; and testing an array of the optical fibers based on the ratio. Light transmittance of the member monotonically varies in the line direction.

12 Claims, 9 Drawing Sheets

Ribbon Fiber Cable 200

Aperture
Axis of Symmetry of Aperture
Center Line
Ribbon Fiber Cable 200

Direction in which the thickness of the absorptive ND filter uniformly decreases Center Line Ribbon Fiber Cable 200

TESTING METHOD, LIGHT RECEIVING DEVICE, AND TESTING SYSTEM

BACKGROUND

Technical Field

The present invention generally relates to a test for a ribbon fiber cable.

Related Art

A ribbon fiber cable patch cord having a connector attached to both ends of a ribbon fiber cable bundling a plurality of optical fibers is used in a data center to support an increase in the amount of data transmitted.

In the ribbon fiber cable used in the ribbon fiber cable patch cord, a plurality of optical fibers is arranged parallely such that both ends thereof form a single line, and a ribbon fiber cable that covers and integrates these in resin is used. In the process of creating the ribbon fiber cable, the parallely arranged optical fibers may cross, causing the arrangement order of the optical fibers in one end of the ribbon fiber cable and the arrangement order of the optical fibers on the other end to differ.

As a result, after constructing the ribbon fiber cable, a test of the transmission loss of each optical fiber constituting the ribbon fiber cable is performed, in addition to a test, in both ends of the ribbon fiber cable, for whether the arrangement order of the optical fibers (array of optical fibers) constituting is desirable.

Conventionally, as described in patent literature 1, a test of transmission loss or a test of the array of optical fibers is performed by: separating the ribbon fiber cable, connecting a fanout cord to the ribbon fiber cable, or the like; branching the ribbon fiber cable into individual optical fibers; and thereafter measuring the power of light exiting from the optical fibers one at a time. Then, the power of light exiting from the optical fibers is measured one at a time using a single optical sensor by moving the optical sensor or the optical fiber, or the power of light exiting from the optical fibers is measured one at a time using a plurality of optical sensors by preparing the plurality of optical sensors and connecting the plurality of optical sensors respectively to each of the branched optical fibers.

Patent Literature

Patent Literature 1: Japanese Patent Application Publication No. H8-15086

Moving the optical sensor or the optical fiber as in the method described above is inefficient, and it is expensive to prepare the plurality of optical sensors. Thus, in recent years, the transmission loss of ribbon fiber cables has also been tested using a single optical sensor without branching the ribbon fiber cable into individual optical fibers by using a large-diameter optical sensor capable of receiving light exiting from every end face of the plurality of optical fibers constituting the ribbon fiber cable. In this method, it is possible to test the transmission loss of the individual optical fibers by making light incident to the optical fibers constituting the ribbon fiber cable one at a time.

However, in the method using the large-diameter optical sensor, it cannot be known which optical fiber among the plurality of optical fibers constituting the ribbon fiber cable the light is exiting from, and the array of optical fibers cannot be tested.

SUMMARY

One or more embodiments of the present invention is to efficiently test both the transmission loss and the array of optical fibers using a single optical sensor.

The testing method according to one or more embodiments of the present invention is a testing method for a ribbon fiber cable, the ribbon fiber cable being composed of a plurality of optical fibers, where end faces of the plurality of optical fibers are arranged in a single line at a first end face of the ribbon fiber cable, the testing method having: a step for making light incident to each optical fiber one at a time at a second end face of the ribbon fiber cable on the opposite side of the first end face, using a common optical sensor to measure the power of the light exiting from each optical fiber at the first end face of the ribbon fiber cable, and storing the measured power as a first power for each optical fiber; a step for disposing a member between the first end face of the ribbon fiber cable and the optical sensor, where the member monotonically changes the ratio of transmitted light in the line direction of the plurality of optical fibers; a step for making light incident to each optical fiber one at a time at the second end face of the ribbon fiber cable, using the optical sensor to measure the power of light exiting from each optical fiber at the first end face of the ribbon fiber cable and being transmitted through the member, and storing the measured power as a second power for each optical fiber; a step for calculating the ratio of the second power to the first power for each optical fiber; and a step for testing the array of the optical fibers based on the calculated ratio.

The member may have an aperture where the ratio of transmitted light monotonically changes in the line direction of the plurality of optical fibers. The aperture may be a shape that widens in the line direction of the plurality of optical fibers.

Furthermore, the member may be an ND filter, where the ratio of transmitted light monotonically changes in the line direction of the plurality of optical fibers. The thickness of the ND filter in the exit direction may decrease in the line direction of the plurality of optical fibers.

The array of optical fibers may be tested in a step for testing the array of optical fibers based on the way the calculated ratio changes. Furthermore, the array of optical fibers may be tested in a step for testing the array of optical fibers by comparing the calculated ratio to a reference value prepared in advance.

Furthermore, the testing method according to one or more embodiments of the present invention is a testing method for a ribbon fiber cable, the ribbon fiber cable being composed of a plurality of optical fibers, where end faces of the plurality of optical fibers are arranged in a single line at a first end face of the ribbon fiber cable, the testing method having: a step for making light incident to each optical fiber one at a time at a second end face of the ribbon fiber cable on the opposite side of the first end face and measuring the power of light exiting from each optical fiber at the first end face of the ribbon fiber cable and being transmitted through a member that monotonically changes the ratio of transmitted light in the line direction of the plurality of optical fibers; and a step for testing the array of the optical fibers based on the measured power for each optical fiber.

Furthermore, the light receiving device according to one or more embodiments of the present invention, has: an adapter for connecting to a ribbon fiber cable composed of a plurality of optical fibers, where end faces of the plurality of optical fibers are arranged in a single line at a first end face of the ribbon fiber cable; an optical sensor for measuring the power of light exiting from the ribbon fiber cable connected to the adapter; and a transmission unit capable of switching between being disposed between the adapter and the optical sensor and not being disposed between the adapter and the optical sensor; where the ratio of light transmitted through the transmission unit monotonically changes in the line direction of the plurality of optical fibers in the ribbon fiber cable connected to the adapter.

Furthermore, the testing system according to one or more embodiments of the present invention is a testing system for a ribbon fiber cable, the ribbon fiber cable being composed of a plurality of optical fibers, where end faces of the plurality of optical fibers are arranged in a single line at a first end face of the ribbon fiber cable, the testing system having: a light emitting device for making light incident to each optical fiber one at a time at a second end face of the ribbon fiber cable on the opposite side of the first end face; an adapter for connecting to the second end face of the ribbon fiber cable; an optical sensor for measuring the power of light exiting from the ribbon fiber cable connected to the adapter; and a transmission unit capable of switching between being disposed between the adapter and the optical sensor and not being disposed between the adapter and the optical sensor; where the ratio of light transmitted through the transmission unit monotonically changes in the line direction of the plurality of optical fibers in the ribbon fiber cable connected to the adapter.

According to one or more embodiments of the present invention, it is possible to efficiently test both the transmission loss and the array of optical fibers using a single optical sensor.

DETAILED DESCRIPTION

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

<Examination System 100>

Figure 1:
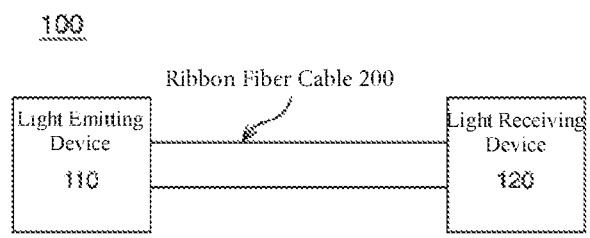
FIG. 1 is a diagram illustrating a testing system 100 according to one or more embodiments of the present invention.

FIG. 1 is a diagram illustrating a testing system 100 according to one or more embodiments of the present invention. The testing system 100 has a light emitting device 110 and a light receiving device 120. The light emitting device 110 and the light receiving device 120 are connected to a ribbon fiber cable 200, light is made incident from the light emitting device 110 to the ribbon fiber cable 200, the incident light passes through the ribbon fiber cable 200, and exits to the light receiving device 120.

Figure 2:
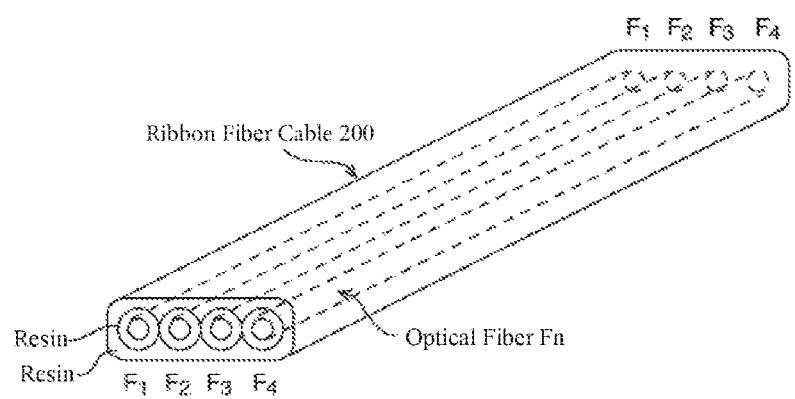
FIG. 2 is a diagram illustrating one example of a ribbon fiber cable 200.

The ribbon fiber cable 200, as illustrated in FIG. 2, is constituted of an N number of optical fibers Fn (n=1, 2, . . . , N), and the end faces of the plurality of optical fibers Fn are arranged in a single line in both ends of the ribbon fiber cable 200. FIG. 2 illustrates a four-fiber ribbon fiber cable composed of four optical fibers. There are, for example, those having two-fiber, eight-fiber, twelve-fiber and sixteen-fiber as additional ribbon fiber cables 200 in which the end faces of the optical fibers are arranged in a single line at the end portion. Furthermore, the ribbon fiber cable 200 may have a connector such as an Multi-fiber Push On (MPO) connector or an MT ferrule (connector) attached to the end portion, a ribbon fiber cable with no connectors attached, or the like.

As illustrated in FIG. 2, when there is no crossing of the optical fibers Fn from one end of the ribbon fiber cable 200 to the other end, in the one end, the optical fiber disposed on the left-most side is disposed on the right-most side in the other end. Therefore, in the one end, when the optical fibers Fn are arranged in order from the left as $F_1$, $F_2$, $F_3$, and $F_4$, they are arranged in the other end in order from the left as $F_4$, $F_3$, $F_2$, and $F_1$.

Generally, a ribbon fiber cable 200 is constructed by arranging a plurality of strands of optical fibers Fn formed using glass or plastic and which are covered by resin, and further covering and integrating the arranged strands using resin. When the arranged strands are further covered by resin, the strands (optical fibers Fn) may cross unintentionally, and as a result, the arrangement order of the optical fibers Fn in both ends of the ribbon fiber cable 200 may differ from each other. Therefore, when constructing the ribbon fiber cable 200, a test of the arrangement order of the optical fibers Fn (array of optical fibers Fn) is performed to confirm whether the optical fibers Fn have been covered by resin without crossing.

Figure 3A:
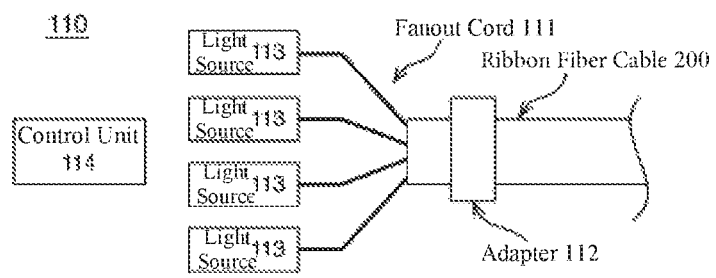
FIG. 3A is a diagram illustrating a light emitting device 110 according to one or more embodiments of the present invention.
Figure 3B:
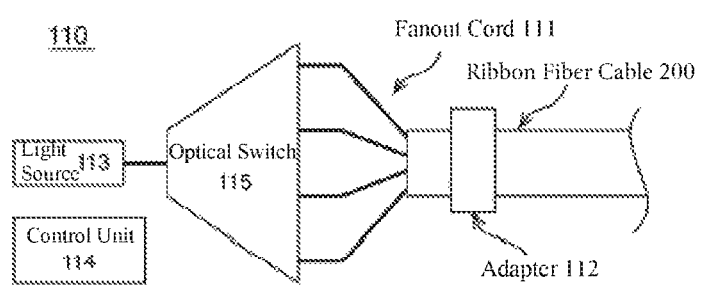
FIG. 3B is a diagram illustrating the light emitting device 110 according to one or more embodiments of the present invention.

The light emitting device 110 is able to make light incident to the optical fibers Fn of the ribbon fiber cable 200 one at a time. The light emitting device 110, for example, as illustrated in FIG. 3A, may be configured to have: a fanout cord 111 for branching the ribbon fiber cable 200 into individual optical fibers, an adapter 112 for connecting the ribbon fiber cable 200 and the fanout cord 111, a plurality of light sources 113 for making light incident to the branched optical fibers, and a control unit 114 for controlling this light source 113. Furthermore, the light emitting device 110, for example, as illustrated in FIG. 3B, may be configured to have: the fanout cord 111 for branching the ribbon fiber cable 200 into individual optical fibers, the adapter 112 for connecting the ribbon fiber cable 200 and the fanout cord 111, a single light source 113, an optical switch 115 for switching the optical fibers to which light exiting from the light source 113 is made incident, and a control unit 114 for controlling the light source 113 and the optical switch 115.

Figure 4:
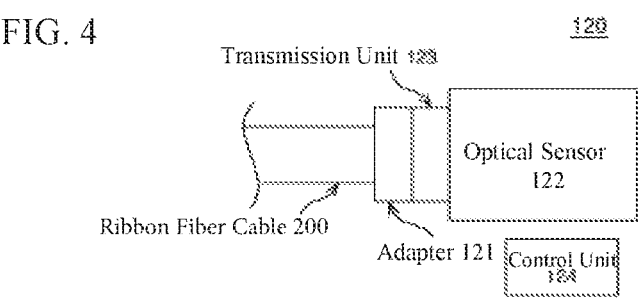
FIG. 4 is a diagram illustrating a light receiving device 120 according to one or more embodiments of the present invention.

The light receiving device 120, as illustrated in FIG. 4, has an adapter 121, an optical sensor 122, a transmission unit 123, and a control unit 124.

The adapter 121 is an adapter for connecting the ribbon fiber cable 200 to the light receiving device 120. As described above, the ribbon fiber cable 200 may have a connector such as an MPO connector or an MT ferrule (connector) attached to both ends, a ribbon fiber cable with no connectors, or the like. Accordingly, the adapter 121 may be prepared to match the shape of the end face of the ribbon fiber cable 200.

The optical sensor 122 only has a diameter capable of receiving light exiting from the end face of the entire optical fiber Fn of the ribbon fiber cable 200 connected to the adapter 121. Therefore, even when light exits from any of the optical fibers Fn of the ribbon fiber cable 200 connected to the adapter 122, the optical sensor 122 can measure the power of the exiting light.

The optical sensor 122 may be, for example, a large diameter photodiode, and a substance such as Si, InGaAs, or Ge may be selected as appropriate for the measurement frequency. Furthermore, the optical sensor 122 may also be a combination of a large diameter photodiode and a lens having a light receiving range the same as this photodiode.

Figure 5:
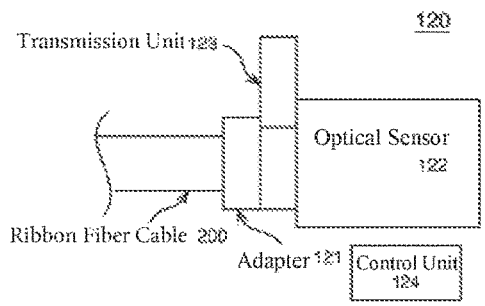
FIG. 5 is a diagram illustrating the light receiving device 120 according to one or more embodiments of the present invention.

The transmission unit 123 is disposed between the adapter 121 and the optical sensor 122. Furthermore, as illustrated in FIG. 5, this transmission unit 123 can slide or rotate and be removed from between the adapter 121 and the optical sensor 122 while maintaining the distance between the adapter 121 and the optical sensor 122. In order to perform this removal, the light receiving device 120 may be configured to have a mechanical member for removing the transmission unit 123 from between the adapter 121 and the optical sensor 122, and this removal may be controlled by a control unit 124 or the like. The transmission unit 123 may be configured such that it can be manually removed from between the adapter 121 and the optical sensor 122.

Furthermore, the adapter 121, the optical sensor 122, and the transmission unit 123 may be configured such that they can be precisely positioned by a positioning means such as a positioning pin. This makes it possible to prevent the adapter 121, the optical sensor 122, and the transmission unit 123 from shifting, and enables testing for transmission loss or testing of the array of the optical fibers to be precisely performed.

As described above, according to one or more embodiments of the present invention, the transmission unit 123 can switch between being disposed between the adapter 121 and the optical sensor 122 and not being disposed between the adapter 121 and the optical sensor 122. Accordingly, according to one or more embodiments of the present invention, when the transmission unit 123 is not between the adapter 121 and the optical sensor 122, it is possible to measure a first power PAn (n=1, 2, . . . , N), which is the power of light exiting from the optical fibers Fn. This first power PAn can be used in testing for transmission loss.

Furthermore, according to one or more embodiments of the present invention, when the transmission unit 123 is between the adapter 121 and the optical sensor 122, it is possible to measure a second power PBn (n=1, 2, . . . , N), which is the power of light exiting from the optical fibers Fn and being transmitted through the transmission unit 123. The ratio PBn/PAn of the second power PBn to the first power PAn is the ratio of light transmitted through the transmission unit 123 (transmission rate of the transmission unit 123).

Figure 6:
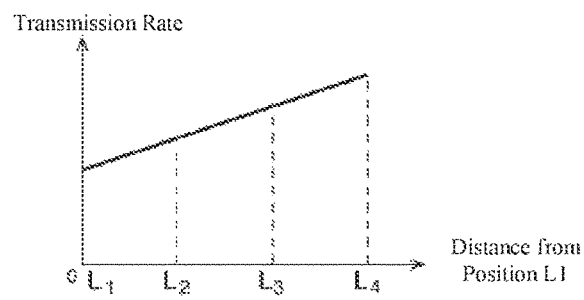
FIG. 6 is a diagram illustrating one example of the transmission rate of a transmission unit 123 according to one or more embodiments of the present invention.

According to one or more embodiments of the present invention, as illustrated in FIG. 6, a member which monotonically changes the transmission rate in the line direction of the plurality of optical fibers is used as the member for the transmission unit 123. That is, according to one or more embodiments of the present invention, the transmission rate of the transmission unit 123 is configured to monotonically increase (monotonically decrease) in the line direction of the plurality of optical fibers. In FIG. 6, vertical axis represents the transmission rate, and the horizontal axis represents the distance from position $L_1$ when four optical fibers $F_1$, $F_2$, $F_3$, $F_4$ are lined up in order in positions $L_1$, $L_2$, $L_3$, and $L_4$. In FIG. 6, the transmission rate at position $L_1$ is the lowest, and the transmission rate increases at positions $L_2$, $L_3$, and $L_4$ as the distance from position $L_1$ grows. That is, in FIG. 6, the transmission rate of the transmission unit 123 is monotonically increasing.

Therefore, according to one or more embodiments of the present invention, when the end faces of the optical fibers Fn are lined up in order of $F_1$, $F_2$, . . . , $F_N$ at the end face of the optical fiber 200 (that is, the end face on the exit side) connected to the adapter 121, then a uniform increase (or decrease) is expected in the order of the ratio $PB_1/PA_1$ for optical fiber $F_1$, the ratio $PB_2/PA_2$ for optical fiber $F_2$, . . . , and the ratio $PB_N/PA_N$ for optical fiber $F_N$.

As a result, according to one or more embodiments of the present invention, obtaining the ratio PBn/PAn for each optical fiber Fn enables testing for the array of the optical fibers Fn to be performed. According to one or more embodiments of the present invention, for example, if the ratio PBn/PAn is monotonically changing, it can be confirmed that the lineup order of the optical fibers Fn has not flipped between one end of the ribbon fiber cable 200 to the other end, and if the ratio PBn/PAn does not monotonically change then it can be confirmed that the lineup order of the optical fibers Fn is flipped between one end of the ribbon fiber cable 200 and the other end (that is, the optical fibers Fn are crossed).

As described above, according to one or more embodiments of the present invention, it is possible to efficiently perform both testing of transmission loss and testing of the array of the optical fibers using only one optical sensor without moving the optical sensor or the optical fibers.

The testing system 100 may have a control device separate from the light emitting device 110 and the light receiving device 120 for controlling the operation of the light emitting device 110 and the light receiving device 120. This makes it possible to facilitate suppressing the function of the light emitting unit 110 and the light receiving unit 120, synchronizing the operation of the light emitting unit 110 and the light receiving unit 120, or the like.

Furthermore, the light receiving device 120 or the control device may be configured to store the relationship between the transmission rate of the transmission unit 123 and the position Ln as illustrated in FIG. 6 as a reference table. Moreover, the light receiving device 120 or the control device may be configured to compare the ratio PBn/PAn of each optical fiber Fn to the reference table to confirm the position Ln on the exit side of the optical fibers Fn. That is, the array of the optical fibers may be tested by comparing the ratio PBn/PAn to a reference value prepared in advance.

Furthermore, the testing system 100 may be configured to have a display device. Such a configuration enables changes in the ratio PBn/PAn to be displayed and enables testing of the array of the optical fibers Fn to be performed based on a display on the display device. Note that the display device may be provided on the light receiving device 120, or it may be provided as a device separate from the light receiving device 120.

Furthermore, the first power PAn may be obtained by directly connecting the adapter 121 and the optical sensor 122. At this time, the distance between the adapter 121 and the optical sensor 122 will differ between measuring the first power PAn and measuring the second power PBn, and thus there is a possibility that the ratio PBn/PAn will be a value that differs from the transmission rate of the transmission unit 123, but there will be no change in the trend of the ratio PBn/PAn monotonically changing. Therefore, even in this case, it is possible to test the array of the optical fibers Fn.

<Transmission Unit 123>

Figure 7A:
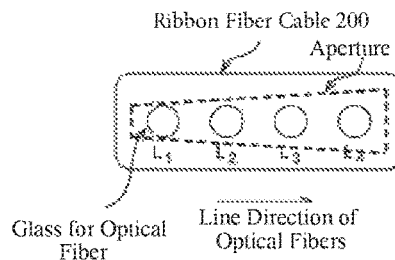
FIG. 7A is a diagram illustrating one example of the transmission unit 123 according to one or more embodiments of the present invention.
Figure 7B:
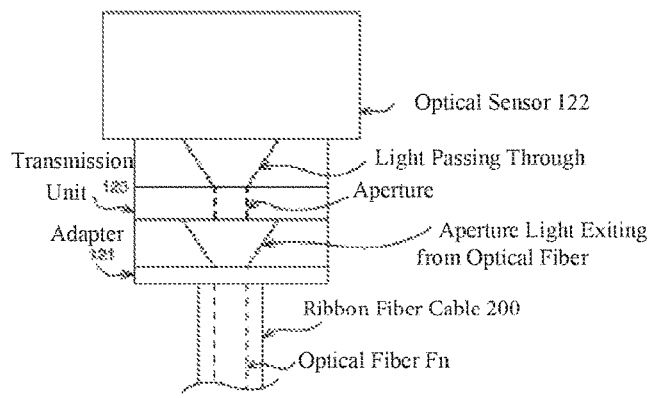
FIG. 7B is a diagram illustrating one example of the transmission unit 123 according to one or more embodiments of the present invention.

The transmission unit 123 may be configured to have an aperture which only permits a portion of the light exiting from the other end of the ribbon fiber cable 200 to be transmitted. Moreover, as illustrated in FIG. 7A and FIG. 7B, the aperture of the transmission unit 123 may, for example, have a shape which widens (narrows) in the line direction of the plurality of optical fibers Fn. FIG. 7A is a diagram illustrating the relationship between the end face of the ribbon fiber cable 200 on the side from which light exits (exit side) and the aperture; FIG. 7B is a diagram illustrating only a portion of the light exiting from the optical fibers Fn transmitted through the aperture of the transmission unit 123 due to the aperture of the transmission unit 123. In FIG. 7A and FIG. 7B, the aperture is represented by the dashed line. In FIG. 7A, the end face of the optical fibers Fn are lined up in a single row in positions Ln (n=1, 2, . . . , N), and the aperture is shaped to widen in the line direction of the optical fibers Fn. In FIG. 7B, the line direction of the optical fibers Fn is the direction orthogonal to the face of the paper.

As illustrated in FIG. 7B, the light exiting from the end faces of the optical fibers Fn diffuses. The aperture is separated from the end face of the ribbon fiber cable 200 just by a predetermined interval, and only a portion of the diffused light is transmitted through the aperture.

In FIG. 7A, the width of the aperture widens from position $L_1$ to position $L_N$. Thus, the least amount of light is transmitted through the aperture at position $L_1$ and increases in the order of position $L_2$, $L_3$, and $L_4$. Thus, the transmission rate of such a transmission unit 123 monotonically increases. That is, similar to FIG. 6, the transmission rate of the transmission unit 123 monotonically changes. Therefore, the transmission unit 123 having an aperture as illustrated in FIG. 7A and FIG. 7B enables testing of the array of the optical fibers Fn.

Figure 8:
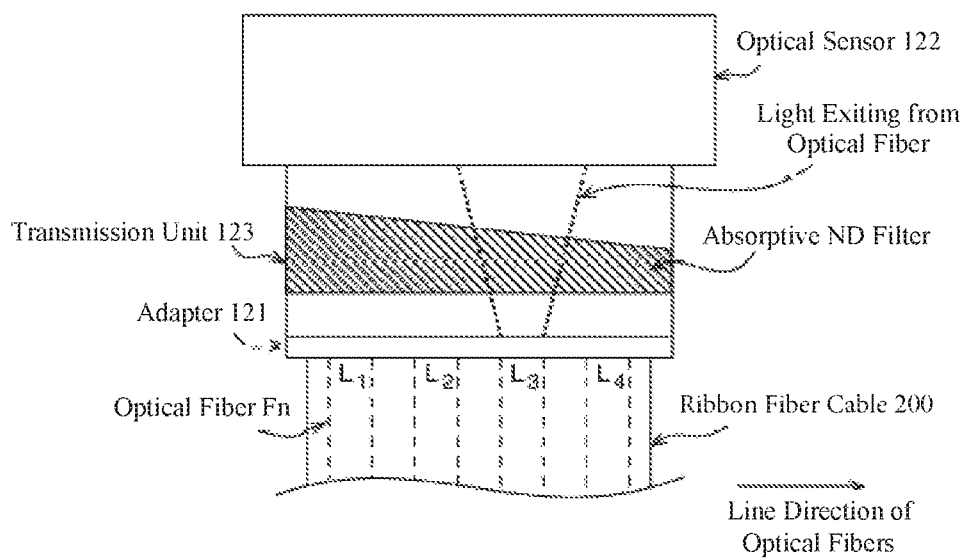
FIG. 8 is a diagram illustrating one example of the transmission unit 123 according to one or more embodiments of the present invention.

Furthermore, the transmission unit 123 may be an absorptive neutral density (ND) filter which absorbs a portion of the light exiting form the other end of the ribbon fiber cable. Moreover, as illustrated in FIG. 8, the thickness of the absorptive ND filter in the exit direction may be configured to monotonically increase (or decrease) in the line direction of the plurality of optical fibers. In FIG. 8, the end faces of the optical fibers Fn are lined up in a single row at positions Ln (n=1, 2, . . . , N), and the thickness of the absorptive ND filter increases in the line direction of the optical fibers Fn. Furthermore, in FIG. 8, the absorptive ND filter is separated from the end face of the ribbon fiber cable 200 just by a predetermined interval.

In an absorptive ND filter, the absorption amount of light increases as the distance through which the light is transmitted increases. Therefore, when the absorption coefficient is k and the distance through which the light is transmitted is t, the transmission rate of the absorptive ND filter is $\exp(-kt)$. In FIG. 8, the thickness of the absorptive ND filter decreases from position $L_1$ toward position $L_N$. Thus, the least amount of light is transmitted through the absorptive ND filter at position $L_1$ and increases in the order of positions $L_2$, $L_3$, and $L_4$. Therefore, the transmission rate of such a transmission unit 123 monotonically increases. That is, similar to FIG. 6, the transmission rate of the transmission unit 123 monotonically changes. Therefore, using an absorptive ND filter as the transmission unit 123 enables testing of the array of the optical fibers Fn.

So long as the transmission unit 123 monotonically changes in the line direction of the plurality of optical fibers as illustrated in FIG. 6, it may be anything and is not limited to the aspects described above. For example, the transmission unit may be a surface of a glass plate that has had gradation processing performed thereon by coating the surface or the like.

<Array Testing Method for the Optical Fibers Fn in the Ribbon Fiber Cable 200>

Figure 9:
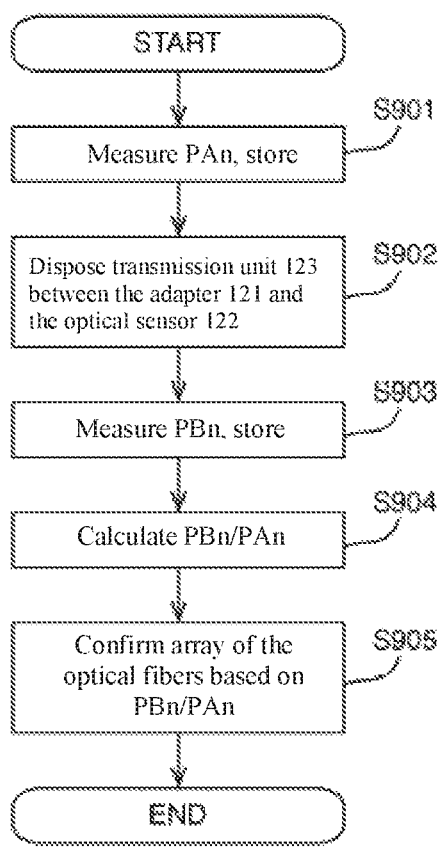
FIG. 9. is one example of an array testing method for optical fibers Fn according to one or more embodiments of the present invention.

FIG. 9 is an example of an array testing method for the optical fibers Fn according to one or more embodiments of the present invention. First, the power is measured for each optical fiber Fn when the transmission unit 123 is not disposed between the adapter 121 and the optical sensor 122, and the measured power is stored as the first power PAn (step S901). The transmission unit 123 is disposed between the adapter 121 and the optical sensor 122 (step S902), the power is measured for each optical fiber Fn when the transmission unit 123 is disposed between the adapter 121 and the optical sensor 122, and the measured power is stored as the second power PBn (Step S903). The ratio PBn/PAn of the second power PBn to the first power PAn is calculated for each optical fiber Fn (step S904). The array of the optical fibers Fn is confirmed based on the calculated ratio PBn/PAn (step S905).

Figure 10:
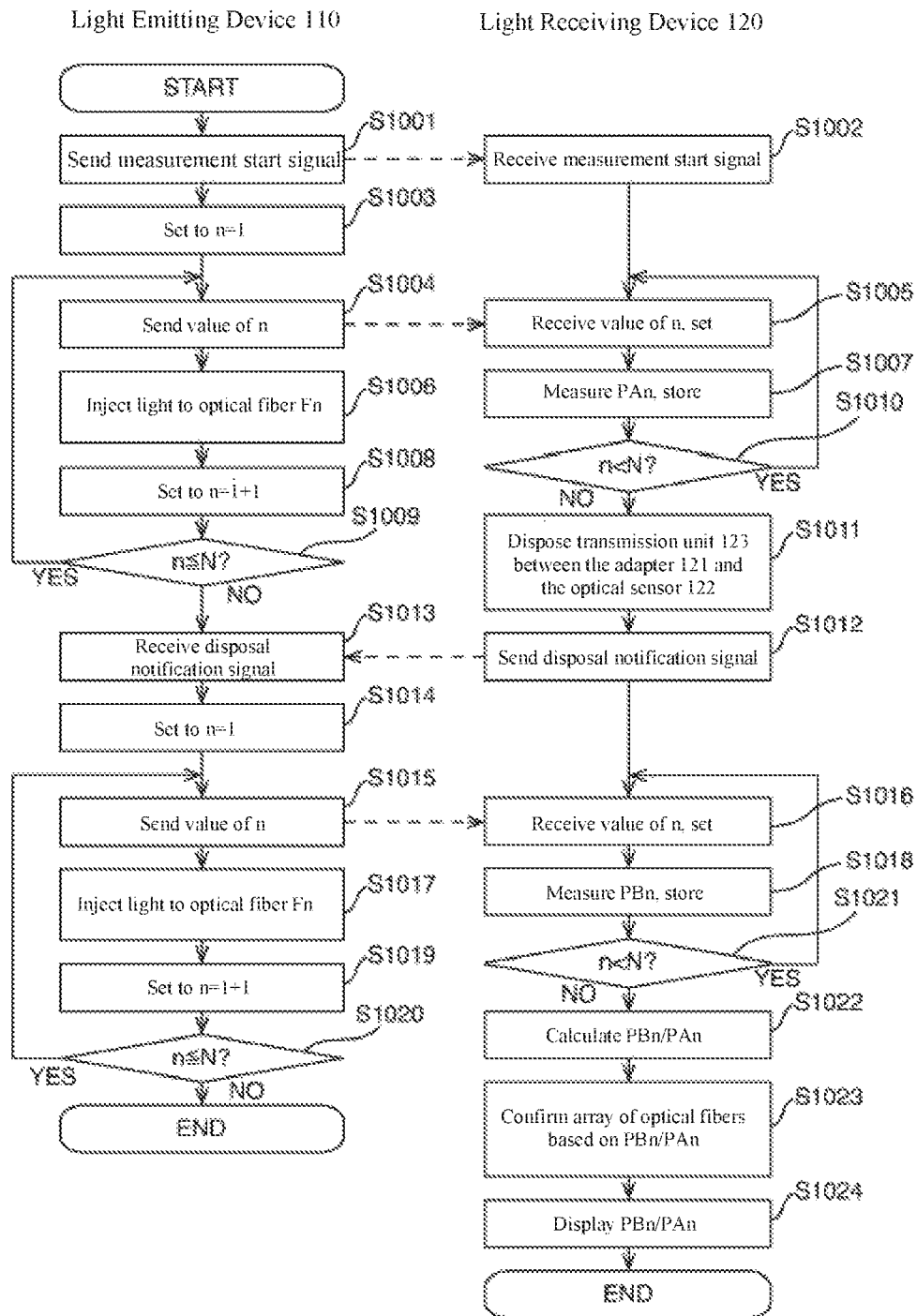
FIG. 10 is a flowchart showing one example of specific processing using the array testing method for the optical fibers Fn according to one or more embodiments of the present invention.

FIG. 10 is a flow charge representing an example of specific processing according to the array testing method for the optical fibers Fn according to one or more embodiments of the present invention. First, the power is measured for each optical fiber Fn when the transmission unit 123 is not disposed between the adapter 121 and the optical sensor 122. For example, while the transmission unit 123 is not disposed between the adapter 121 and the optical sensor 122, the light emitting device 110 starts processing, sends a measurement start signal to the light receiving device 120 (step S1001), the light receiving device 110 receives this measurement start signal, and starts processing (step S1002). After step S1001, the light emitting device 110 is set to n=1 (step S1003), sends a signal representing the value of n to the light receiving device 120 (step S1004), the light receiving device 120 receives this signal, and sets the value of n to the value represented by the received signal (step S1005).

After step S1004, the light emitting device 110 injects light into the optical fiber Fn (step S1006), the light receiving device 120 measures the power of the light exiting from the optical fiber Fn, and stores the power as the first power PAn (step S1007).

After step S1006, the light emitting device 110 is set to n=n+1 (step S1008) and confirms whether n≤N (step S1009). If n≤N (step S1009, YES), it returns to step S1004.

After step S1007, the light receiving device 120 confirms whether n<N (step S1010). If n<N (step S1010, YES), it returns to step S1005). If n<N is false (step S1010, NO), the light receiving device 120 disposes the transmission unit 123 between the adapter 121 and the optical sensor 122 (step S1011), sends a signal to the light emitting device 110 indicating that the transmission unit 123 has been disposed (step S1012), and the light emitting device 110 receives this signal (step S1013).

After step S1013, the power is measured for each optical fiber Fn when the transmission unit 123 is not disposed between the adapter 121 and the optical sensor 122. For example, while the transmission unit 123 is disposed between the adapter 121 and the optical sensor 122, the light emitting device 110 is set to n=1 (step S1014), sends a signal representing the value of n to the light receiving device 120 (step S1015), the light receiving device 120 receives this signal, and sets the value of n to the value represented by the received signal (step S1016).

After step S1015, the light emitting device 110 injects light into the optical fiber Fn (step S1017), the light receiving device 120 measures the power of the light exiting from the optical fiber Fn, and this power is stored as the second power PBn (step S1018).

After step S1017, the light emitting device 110 is set to n=n+1 (step S1019) and confirms whether n≤N (step S1020). If n≤N (step S1020, YES), it returns to step S1015. If n≤N is false (step S1020, NO), processing ends.

After step S1018, the light receiving device 120 confirms whether n<N (step S1021). If n<N (step S1021, YES), it returns to step S1016). If n<N is false (step S1021, NO), the light receiving device 120 calculates the ratio PBn/PAn for each optical fiber Fn (step S1022), confirms the array of the optical fibers Fn based on the calculated ratio PBn/PAn (step S1023), displays the array of the optical fibers and the first power PAn on a display device (step S1024), and ends processing.

<Polarity of MPO Connectors>

In recent years, ribbon fiber cables having MPO connectors installed which facilitate connection/disconnection between ribbon fiber cables are being used. An MPO installed ribbon fiber cable is constructed by, for example, adhering and fixing a ribbon fiber cable to an MT ferrule, and inserting the MT ferrule installed ribbon fiber cable into an MPO housing. The MPO housing is provided with a structure that facilitates connection/disconnection between ribbon fiber cables.

Therefore, the array of optical fibers can be tested using the method according to one or more embodiments of the present invention at each stage of the construction process for MPO connector installed ribbon fiber cables (ribbon fiber cable assembly process, MT ferrule installed ribbon fiber cable assembly process, MPO connector installed ribbon fiber cable assembly process).

Figure 11:
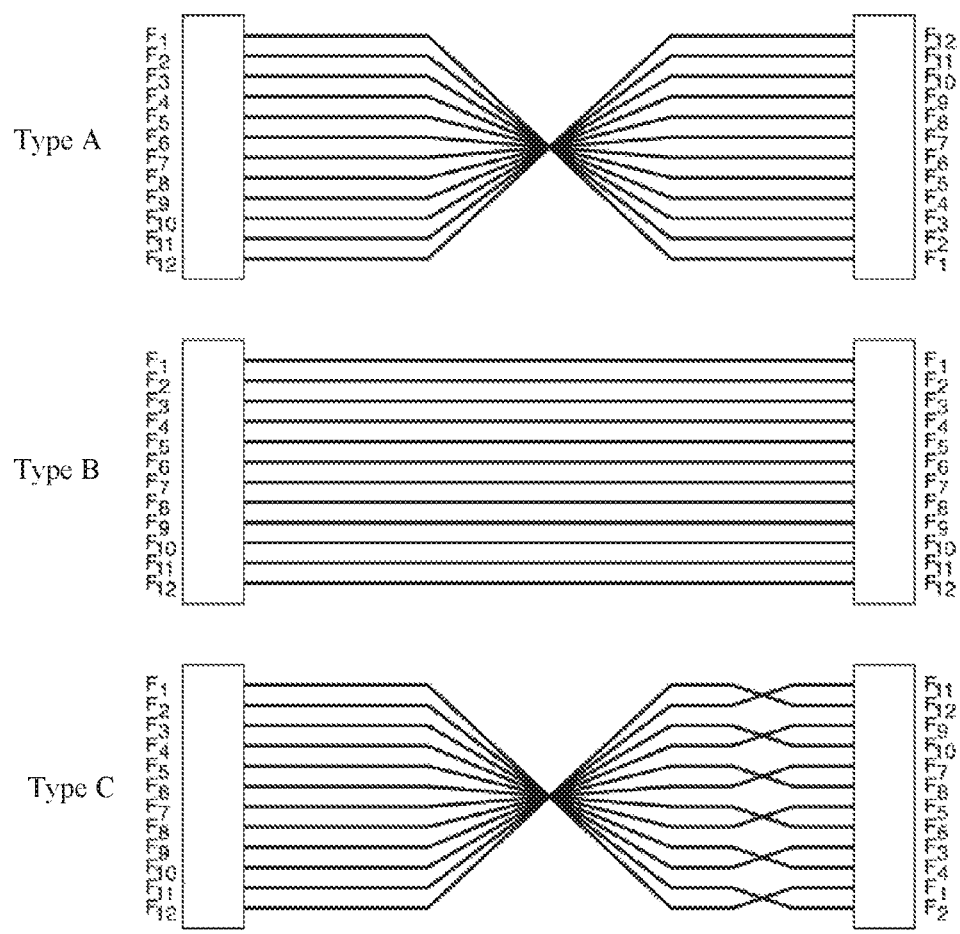
FIG. 11 is a diagram illustrating the polarity of a twelve-fiber MPO-attached ribbon fiber cable.

As illustrated in FIG. 11, there are three types of polarity for MPO installed ribbon fiber cables having 12 fibers.

For type B, the optical fibers Fn do not cross from one end of the ribbon fiber cable 200 to the other end. When the optical fibers Fn at one end are lined up in order from the left as $F_1$, $F_2$, $F_3$, $F_4$, $F_5$, $F_6$, $F_7$, $F_8$, $F_9$, $F_{10}$, $F_{11}$, $F_{12}$, the optical fibers Fn are lined up at the other end in order from the left as $F_{12}$, $F_{11}$, $F_{10}$, $F_9$, $F_8$, $F_7$, $F_6$, $F_5$, $F_4$, $F_3$, $F_2$, $F_1$.

For type A, the optical fibers Fn in the ribbon fiber cable 200 do not cross from one end of the ribbon fiber cable 200 to the other end, but the entire line of optical fibers Fn is twisted a half rotation.

For type A and B MPO connector installed ribbon fiber cables, when the optical fibers Fn are lined up on the light emitting device 110 side in the order of $F_1$, $F_2$, $F_3$, $F_4$, $F_5$, $F_6$, $F_7$, $F_8$, $F_9$, $F_{10}$, $F_{11}$, $F_{12}$ and light is injected in this order, the ratio PBn/PAn should monotonically change. For example, when a transmission unit which will monotonically increase (monotonically decrease) the ratio PBn/PAn for a type A MPO connector installed ribbon fiber cable is selected as the transmission unit 123, the ratio PBn/PAn for a type B MPO connector installed ribbon fiber cable should monotonically decrease (monotonically increase).

Therefore, according to one or more embodiments of the present invention, the MPO connector installed ribbon fiber cable can test the array of the optical fibers Fn in a type A, B MPO connector installed ribbon fiber cable. Furthermore, according to one or more embodiments of the present invention, when there is an MPO connector installed ribbon fiber cable having an unknown polarity, the polarity of the MPO connector installed ribbon fiber cable can be confirmed. That is, it can be confirmed whether the MPO connector installed optical fiber is a type A, a type B, or neither a type A nor a type B (that is, a type C).

As illustrated in FIG. 11, for type C, a pair of adjacent optical fibers Fn cross each other, and when the optical fibers Fn at one end are lined up in order from the left as $F_1$, $F_2$, $F_3$, $F_4$, $F_5$, $F_6$, $F_7$, $F_8$, $F_9$, $F_{10}$, $F_{11}$, $F_{12}$, the optical fibers Fn at the other end are lined up in order from the left as $F_2$, $F_1$, $F_4$, $F_3$, $F_6$, $F_5$, $F_8$, $F_7$, $F_{10}$, $F_9$, $F_{12}$, $F_{11}$.

Therefore, for type C MPO connector installed ribbon fiber cables, when the optical fibers Fn are lined up on the light emitting device 110 side in the order of $F_1$, $F_2$, $F_3$, $F_4$, $F_5$, $F_6$, $F_7$, $F_8$, $F_9$, $F_{10}$, $F_{11}$, $F_{12}$, the ratio PBn/PAn does not monotonically change even when light is injected in this order.

Accordingly, for type C MPO connector installed ribbon fiber cables, when the ratio PBn/PAn is sorted in the order of $PB_2/PA_2$, $PB_1/PA_1$, $PB_4/PA_4$, $PB_3/PA_3$, . . . , $PB_{12}/PA_{12}$, $PB_{11}/PA_{11}$, the ratio PBn/PAn should monotonically change.

Furthermore, for type C MPO connector installed ribbon fiber cables, when the optical fibers Fn are lined up on the light emitting device 110 side in the order of $F_1$, $F_2$, $F_3$, $F_4$, $F_5$, $F_6$, $F_7$, $F_8$, $F_9$, $F_{10}$, $F_{11}$, $F_{12}$, and light is injected in the order of $F_2$, $F_1$, $F_4$, $F_3$, $F_6$, $F_5$, $F_8$, $F_7$, $F_{10}$, $F_9$, $F_{12}$, $F_{11}$, the ratio PBn/PAn should monotonically change when lined up in the order they were measured.

Therefore, according to one or more embodiments of the present invention, it is possible to test the array of the optical fibers Fn for MPO connector installed ribbon fiber cables when the MPO connector installed ribbon fiber cable is type C.

Furthermore, ribbon fiber cables which are tested for transmission loss before adhering and fixing an MT ferrule and do not have a significant change in transmission loss for each optical fiber are used to construct MT ferrule installed ribbon fiber cables or MPO connector installed ribbon fiber cables. Therefore, MT ferrule installed ribbon fiber cables and MPO connector installed ribbon fiber cables do not have significant changes in transmission loss for each fiber. That is, for the optical fibers in an MT ferrule installed ribbon fiber cable or an MPO connector installed ribbon fiber cable, the value of the first power PAn should be substantially complete. Therefore, the change in the ratio PBn/PAn is considered to substantially depend only on the second power PBn. Thus, for MT ferrule installed ribbon fiber cables and MPO connector installed ribbon fiber cables, in the method described above, it is possible to test the array of the optical fibers Fn even if the second power PBn is used instead of the ratio PBn/PAn. That is, according to one or more embodiments of the present invention, for MT ferrule installed ribbon fiber cables and MPO connector installed ribbon fiber cables, it is possible to measure only the second power PBn to test the array of the optical fibers Fn.

<Ribbon Fiber Cables Composed of Two-Dimensionally Arrayed Optical Fibers>

Figure 12:
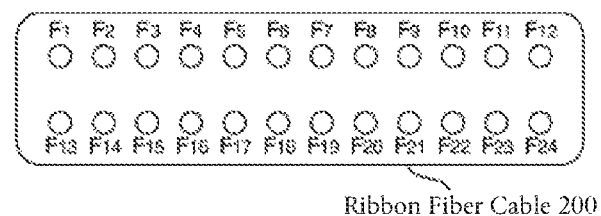
FIG. 12 is a diagram illustrating one example a ribbon fiber cable composed of two-dimensionally arrayed optical fibers.

In recent years, in addition to ribbon fiber cables having optical fibers lined up in a single line, ribbon fiber cables having optical fibers that are two-dimensionally arrayed are being used. FIG. 12 illustrates the end face of the ribbon fiber cable 200 composed of two-dimensionally arrayed optical fibers Fn. The ribbon fiber cable 200 illustrated in FIG. 12 is a ribbon fiber cable having 24 fibers included in two lines of 12 optical fibers Fn.

The ribbon fiber cable 200 composed of two-dimensionally arrayed optical fibers is constructed by first constructing a ribbon fiber cable lining up the optical fibers Fn in a single line, then vertically stacking the constructed ribbon fiber cables and using resin to cover and integrate the stacked ribbon fiber cables. Therefore, it is only possible for the optical fibers Fn to cross during construction of the ribbon fiber cable, and the optical fibers Fn in the line on the top side and the optical fibers Fn in the line on the bottom side will not cross. For example, in FIG. 12, the optical fiber $F_1$ in the line on the top side and the optical fiber $F_{14}$ in the line on the bottom side will not cross.

Figure 13:
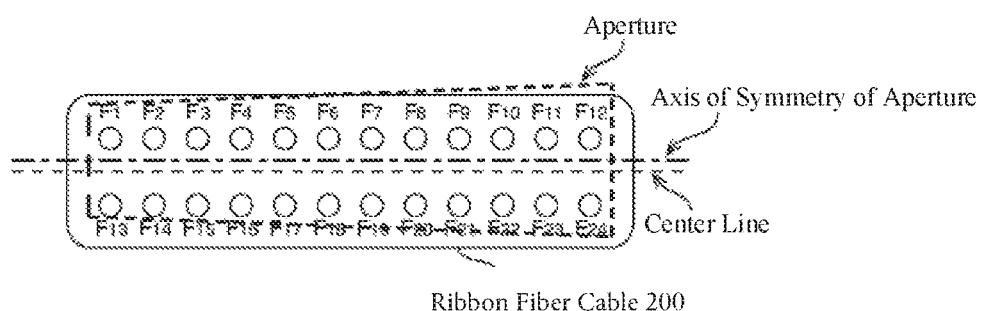
FIG. 13 is a diagram illustrating one example of a disposal of an aperture of the transmission unit 123 according to one or more embodiments of the present invention.

In such a ribbon fiber cable 200, when testing the array of the optical fibers Fn, for example, as illustrated in FIG. 13, the aperture of the transmission unit 123 may be configured as an asymmetric shape with respect to the center line between the line $F_1$ to $F_{12}$ in the top side and the line $F_{13}$ to $F_{24}$ in the bottom side of the optic fibers Fn. In FIG. 13, the aperture is a trapezoid shape which widens in the line direction of the optical fibers Fn, and the axis of symmetry of the aperture is in a position offset from the center line between the line $F_1$ to $F_{12}$ in the top side and the line $F_{13}$ to $F_{24}$ in the bottom side of the optic fibers Fn. Therefore, when a transmission unit 123 including this aperture is used, when the array of the optical fibers Fn is normal, the ratio PBn/PAn will change as illustrated in FIG. 14 when the values of the ratio PBn/PAn are lined up in order.

Figure 14:
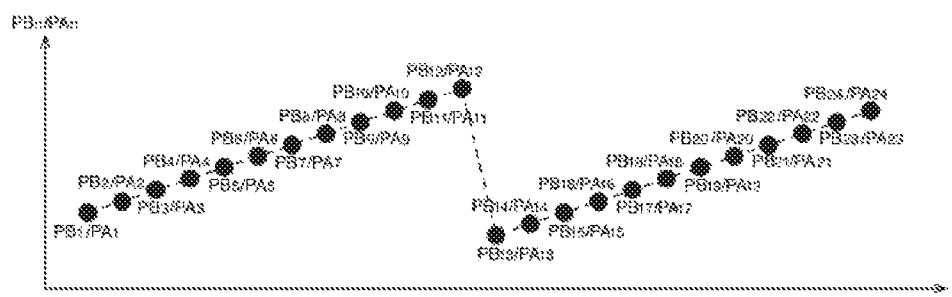
FIG. 14 is a diagram illustrating one example of a change in a ratio PBn/PAn according to one or more embodiments of the present invention.

In FIG. 14, the ratio PBn/PAn monotonically increases from $PB_1/PA_1$ to $PB_{12}/PA_{12}$, decreases from $PB_{12}/PA_{12}$ to $PB_{13}/PA_{13}$, and monotonically increases from $PB_{13}/PA_{13}$ to $PB_{24}/PA_{24}$. Therefore, according to one or more embodiments of the present invention, confirming whether the ratio PBn/PAn changes in this manner enables the array of the optical fibers Fn to be tested, even for ribbon fiber cables having two lines of optical fibers Fn.

Figure 15:
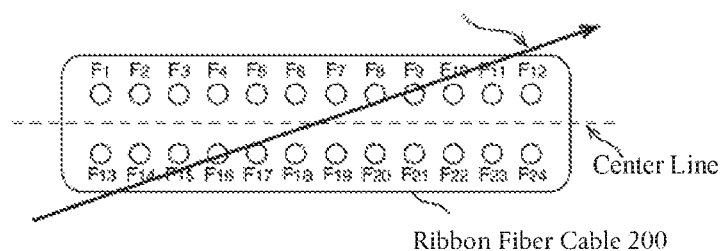
FIG. 15 is a diagram illustrating one example of a disposal of an absorptive ND filter of the transmission unit 123 according to one or more embodiments of the present invention.

Furthermore, in a ribbon fiber cable 200 as illustrated in FIG. 12, when testing the array of the optical fibers Fn, for example, as illustrated in FIG. 15, a transmissive ND filter of the transmission unit 123 may be disposed such that the direction in which the thickness of the transmissive ND filter in the exit direction monotonically decreases is not parallel to the center line between the line $F_1$ to $F_{12}$ in the top side and the line $F_{13}$ to $F_{24}$ in the bottom side of the optic fibers Fn. Even when using a transmission unit 123 including a transmissive ND filter disposed in this manner, if the optical fibers Fn are arrayed normally, the ratio PBn/PAn will change as illustrated in FIG. 14 when the values of the ratio PBn/PAn are lined up in order. Therefore, according to one or more embodiments of the present invention, confirming whether the ratio PBn/PAn changes in this manner enables the array of the optical fibers Fn to be tested, even for ribbon fiber cables having two lines of optical fibers Fn.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE NUMERALS 100 testing system
110 light emitting device
120 light receiving device
121 adapter
122 optical sensor
123 transmission unit
200 ribbon fiber cable
Fn optical fiber
Ln position of optical fiber on the exit side

What is claimed is:

1. A testing method for a ribbon fiber cable comprising optical fibers between a first end face of the ribbon fiber cable and a second end face opposite to the first end face, wherein end faces of each of the optical fibers are lined up in a single line in a line direction at the first end face, the testing method comprising:
    injecting first light into each of the optical fibers at the second end face;
    measuring, with an optical sensor, first power of the first light exiting from each of the optical fibers at the first end face;
    storing, with a memory, the first power for each of the optical fibers;
    disposing a member between the first end face and the optical sensor, wherein light transmittance of the member monotonically varies in the line direction;
    injecting second light into each of the optical fibers at the second end face and causing the second light to be transmitted through the member;
    measuring, with the optical sensor, second power of the second light exiting from each of the optical fibers at the first end face;
    storing, with the memory, the second power for each of the optical fibers;
    calculating a ratio of the second power to the first power for each of the optical fibers; and
    testing an array of the optical fibers based on the calculated ratio.

2. The testing method according to claim 1, wherein the member further comprises an aperture of which light transmittance monotonically varies in the line direction.

3. The testing method according to claim 2, wherein the aperture has a shape that widens in the line direction.

4. The testing method according to claim 1, wherein the member is a neutral density (ND) filter of which light transmittance monotonically varies in the line direction.

5. The testing method according to claim 4, wherein a thickness of the ND filter in an exit direction of light exiting from each of the optical fibers decreases in the line direction.

6. The testing method according to claim 1, wherein the testing tests the array of the optical fibers based on whether the calculated ratios for the optical fibers monotonically vary in the line direction.

7. The testing method according to claim 1, wherein the testing tests the array of the optical fibers by comparing the calculated ratio to a reference value prepared in advance.

8. A testing method for a ribbon fiber cable comprising optical fibers between a first end face of the ribbon fiber cable and a second end face opposite to the first end face, wherein end faces of the optical fibers are lined up in a single line in a line direction at the first end face, the testing method comprising:
   injecting light into each of the optical fibers at the second end face;
   measuring power of the light exiting from each of the optical fibers at the first end face; and
   testing an array of the optical fibers based on the measured power for each of the optical fibers, wherein
   the light is transmitted through a member disposed between the first end face and the second end face, and
   light transmittance of the member monotonically varies in the line direction.

9. A light receiving device, comprising:
   an adapter connected to a ribbon fiber cable comprising optical fibers, wherein end faces of the optical fibers are lined up in a single line in a line direction at a first end face of the ribbon fiber cable;
   an optical sensor that measures power of light exiting from the ribbon fiber cable connected to the adapter; and
   a member that switches between a first state where the member is disposed between the adapter and the optical sensor and a second state where the member is not disposed between the adapter and the optical sensor, wherein
   light transmittance of the member monotonically varies in the line direction.

10. The light receiving device according to claim 9, wherein the adapter, the member, and the optical sensor are positioned by a positioning pin.

11. A testing system for a ribbon fiber cable comprising optical fibers between a first end face of the ribbon fiber cable and a second end face opposite to the first end face, wherein end faces of the optical fibers are lined up in a single line in a line direction at the first end face, the testing system comprising:
    a light emitter that injects light into each of the optical fibers at the second end face;
    an adapter connected to the second end face of the ribbon fiber cable;
    an optical sensor that measures power of the light exiting from the ribbon fiber cable; and
    a member that switches a first state where the member is disposed between the adapter and the optical sensor and a second state where the member is not disposed between the adapter and the optical sensor, wherein
    light transmittance of the member monotonically varies in the line direction.

12. A testing method for a ribbon fiber cable comprising optical fibers between a first end face of the ribbon fiber cable and a second end face opposite to the first end face, wherein end faces of the optical fibers are lined up to form a lines in a line direction at the first end face, the testing method comprising:
    injecting first light into each of the optical fibers at the second end face,
    measuring, with an optical sensor, first power of the first light exiting from each of the optical fibers at the first end face, and
    storing, with a memory, the first power for each of the optical fibers;
    disposing a member between the first end face and the optical sensor, wherein light transmittance of the member monotonically varies in the line direction;
    injecting second light into each of the optical fibers at the second end face;
    measuring, with the optical sensor, second power of the second light exiting from each of the optical fibers at the first end face and causing the second light to be transmitted through the member;
    storing, with the memory, the second power for each of the optical fibers;
    calculating a ratio of the second power to the first power for each of the optical fibers; and
    testing an array of the optical fibers based on the calculated ratio.

* * * * *